United States Patent

Zwetzig et al.

[15] 3,682,486

[45] Aug. 8, 1972

[54] PRESSURE PAD

[72] Inventors: Brian L. Zwetzig, Stone Park; Don R. Coy, Palatine, both of Ill.

[73] Assignee: Ampex Corporation, Redwood City, Calif.

[22] Filed: Dec. 11, 1969

[21] Appl. No.: 884,283

[52] U.S. Cl. ....................................................274/4 B

[51] Int. Cl. ................................................G11b 5/00

[58] Field of Search......161/64, 67, 69; 179/100.2 C, 179/100.2 CA, 100.2 Z; 274/4 R, 4 A, 4 B, 4 C, 4 E, 4 F, 11 A, 11 B, 11 C, 11 E; 242/55.19 A, 197–200

[56] References Cited

UNITED STATES PATENTS

| | | | |
|---|---|---|---|
| 3,521,888 | 6/1970 | Kaneda | 274/4 B |
| 2,912,179 | 11/1959 | Schuyler | 179/100.2 Z |
| 3,486,675 | 12/1969 | Krechman | 242/55.19 A |
| 3,489,362 | 1/1970 | Linning | 242/55.19 A |
| 3,506,271 | 4/1970 | Griefenhagen | 274/4 R |

*Primary Examiner*—Robert B. Hull
*Assistant Examiner*—Dennis A. Dearing
*Attorney*—Fitch, Even & Luedeka and Robert G. Clay

[57] ABSTRACT

A pressure pad for magnetic tapes and particularly for use within magnetic tape cartridges is provided with tape engaging synthetic fibers individually attached at inner ends to a base and with outer free ends for engaging the tape. The fibers are substantially parallel to each other and normal to the plane of the tape and are sufficiently flexible to be bent by the tape and to provide a soft, smooth surface defined by a multiplicity of points of contact. The fibers provide an acceptable low sliding frictional contact with the tape.

2 Claims, 3 Drawing Figures

INVENTORS
BRIAN L. ZWETZIG
DON R. COY

Anderson, Luedeka, Fitch, Even, & Tabin
ATTYS.

PRESSURE PAD

This invention relates to magnetic tape systems and, more particularly, to means for pressing a magnetic tape against a transducer head.

In a typical magnetic tape system for recording or reproduction of sound, the magnetic tape is transported past a sound transducer head and the tape is held in intimate contact with the sound transducer head by a tape engaging pressure pad. Pressure pads have been formed of several materials in the past such as a woven fabric, a felted fabric or a compressible foam pad bearing a Teflon sheet for engaging the tape. The life of the magnetic tape is effected by physical characteristics of the pressure pad such as its surface roughness, its flexibility, and its coefficient of friction. For example, if the pad has a tape engaging surface which is too rough it tends to remove a lubricant on the tape, a common tape lubricant being a graphite material. Removal of the lubricant from the tape and the build up of graphite at localized areas on the pressure pad results in the pad exerting higher pressures at these areas of the tape and this wears the tape at a faster rate and may interfere with sound fidelity. Preferably, the pad is sufficiently flexible or compressible to adapt to the contour of the transducer head and to allow for surface irregularities.

With the present invention, many of the aforementioned disadvantages are overcome with a pressure pad which is less subject to developing high pressures and localized accumulations of lubricant, while providing intimate contact with the head and a low coefficient of friction. Additionally, the pressure pad may be produced at a sufficiently low cost that it may replace conventional pressure pads used in mass produced magnetic tape cartridges or cassettes sold for use within tape recorders found in the home and automobiles.

Accordingly, an object of the invention is to provide an improved, as contrasted with the prior art, tape pressing means of the foregoing kind.

Other objectives and advantages of the invention will become apparent from the following detailed description taken in connection with the accompanying drawings in which.

Figure 1:
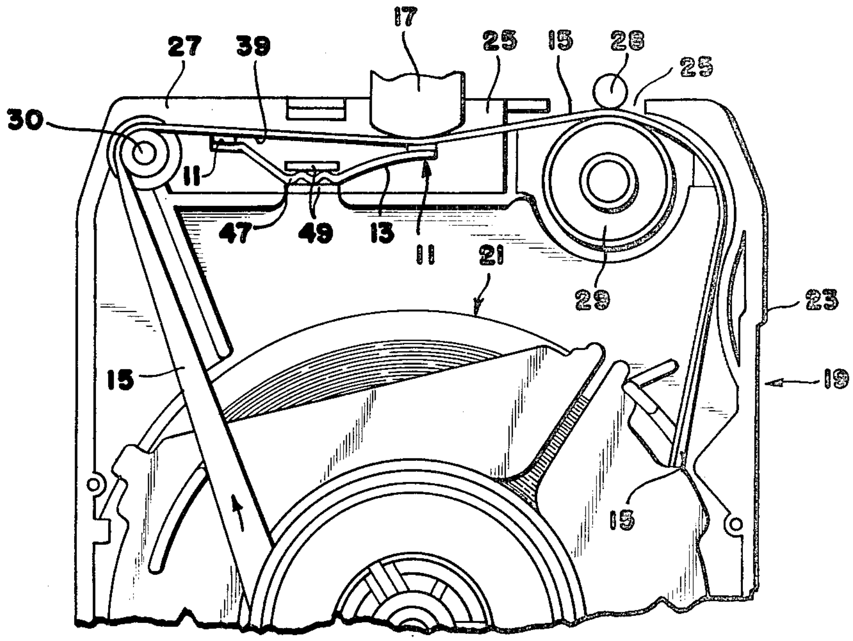
FIG. 1 is a fragmentary, plan view of an endless tape cartridge with its top cover removed and equipped with a tape engaging means of the present invention.
Figure 2:
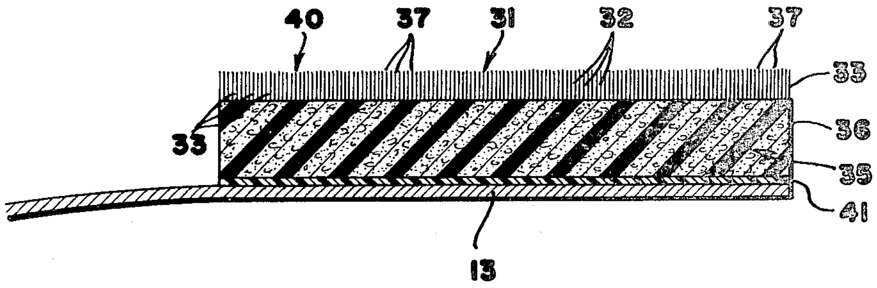
FIG. 2 is an enlarged longitudinal cross sectional view of a tape engaging means including a pressure pad embodying the novel features of the invention.
Figure 3:
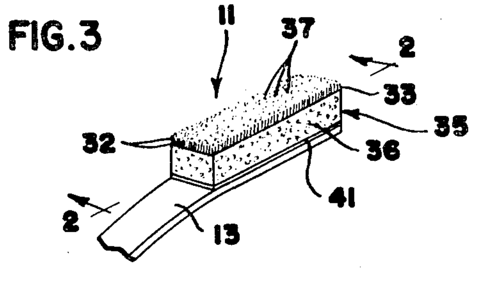
FIG. 3 is a perspective view of a pressure pad constructed in accordance with a preferred embodiment of the invention.

As shown in the drawings for purposes of illustration, the invention is embodied in a tape pressing means comprising a pressure pad 11 and means to mount the pad such as a leaf spring 13 for exerting pressure on a tape 15 to hold the tape in intimate contact with a sound transducer head 17. The illustrated tape cartridge 19 is of a known kind in which an endless magnetic tape is disposed on a reel within a cartridge housing 23. The housing has openings 25 in a front wall 27 to admit the sound transducer head 17 of a player or recording apparatus when the cartridge is in an operative playback or recording position relative thereto, as is illustrated in FIG. 1. In this position, a tape driving capstan 28 of recording or reproducing apparatus also projects into another opening 25 to press the tape 15 into contact with a pressure roller 29; and, as the capstan turns, the tape is pulled from the top of the reel and fed about a guide roller 30. The tape is transported past the transducer head 17 and pressure pad 11 at a substantially constant speed.

In accordance with the present invention, the pressure pad 11 is formed with a body or mass of fibers 32 secured at inner ends 33 to a support 35 with the fibers projecting substantially normal to the plane of the tape, e.g., the fibers 32 project substantially horizontally toward the tape 15 which is illustrated as being on edge in FIG. 1. Outer free ends 37 of the fibers provide individual, spaced, yielding contact points at a lubricated side 39 of the tape 15. The individual fibers 32 are substantially, parallel to each other and are individually free to bend and flex and thereby provide a multipoint, soft surface 40 to press the tape to conform to the transducer head. The resulting surface 40 defined by the free ends of the fibers has a low coefficient of friction and is not subjected to localized areas of high unit load experienced with some prior art pressure pads which accumulate graphite and wear the tape at these load areas. The preferred fibers are small and relatively dense and are sufficiently flexible that the outer ends thereof are flexed slightly in the direction of tape movement, which is to the right for the cartridge illustrated in FIG. 1. As will be explained, the preferred manner of aligning the fibers is by an electrostatic process in which the fibers are all disposed on end and then bonded to a support or base 35 which may be of various materials or to the spring 13 itself. If the fibers are bonded directly to the spring, then the fibers themselves constitute the pressure pad 11 although the preferred pressure pad 11 includes the fibers, a compressible substrate 36, and a plastic sheet 41.

Referring now in greater detail to the illustrated pressure pad 11, the preferred fibers 32 are short, fine, flocked synthetic fibers made of a synthetic material such as rayon although other synthetic fibers may be used. Good results have been obtained with 5½ denier fibers having a short length of 1 to 3 millimeters in length. By way of example only, a commercially acceptable pressure pad 11 uses 5½ denier rayon fibers of about 2 millimeters length, electrostatically flocked to be substantially parallel to each other with the inner ends 33 thereof projecting normal to and bonded to the base 35. The illustrated base 35 includes a urethane, flexible foam pad 36 having a density of about 2 $LB/FT^3$ and a fine pore (80 to 90 P.P.I.). The soft foam pad 36 distributes forces and provides a good support for the fibers. While the length and width of the pressure pad 11 may vary with the tape and transducer head dimensions, the pad 11 used with the illustrated kind of cartridge is about 2 inches in length by about one-fourth inch in width. The compressible pad 36 may be nine thirty-seconds inch in thickness and the illustrated base 35 for the fibers includes the plastic backing sheet 41 bonded to a rear face of the foam pad 36. A suitable plastic backing sheet is a thermoplastic styrene resin sheet such as a 0.020 inch thick sheet sold under the trademark Styron 430 by Dow Chemical Co. of Midland, Michigan. The backing sheet provides additional strength and is readily secured as by an adhesive bonding to one end of the pressure spring 13 mounted in a slot 47 between upstanding lugs 49 attached to the cartridge housing. It will be appreciated that the supporting means 35 for the fibers may be the spring 13 itself or other non-compressible materials and that the fibers could be arranged to be substantially perpendicular to the supporting base by mechanical operations other than an electrostatic flocking operation. The illustrated tape pressing means is made by attaching the plastic sheet 41 to one side of a flocked foam sold under the trademark "SCOTTFORE" by Scott Paper Company and then adhering the other side of the plastic sheet to the spring 13.

In the operation of the illustrated tape cartridge, the sound transducer head 17 is projected into the opening 25 in the front wall of the cartridge housing to press against a side of the tape 15 while the lubricated side 39 of the tape is being pressed by the pressure pad 11 on the flexed spring 13 against the transducer head 17. The free ends 37 of the flocked fibers 32 provide a surface 40 constituted by very small points of contact with the tape to force the tape into intimate contact with the transducer head. As the fibers are thin and easily bendable and made from a synthetic material, the outer surface 40 defined by the free fiber ends, feels smooth and soft and readily accommodates irregularities in the tape or contour of the tape without producing localized areas of high pressure as experienced with conventional pressure pads using a Teflon sheet mounted on a compressible pad. The preferred rayon fiber surface 40 has a relatively low coefficient of friction which allows the tape to slide therepast with a pull from the tape transport capstan 28 and pinch roller 29.

From the foregoing, it will be seen that the present invention provides an improved pressure pad which has parallel, synthetic fibers projecting outwardly to engage the tape at the free ends thereof with the other ends of the fibers bonded to a support. The individual fiber ends provide small points of contact and a relatively smooth soft surface which readily accommodates irregularities which heretofore caused localized areas of high load resulting in premature wear of tape.

Also, the pressure pad 11 meets the commercially relevant criterion of being sufficiently low in cost so that it may be readily substituted for existing low cost pressure pads used in tape cartridges which are sold annually in the millions of units.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A tape pressing means for urging a magnetic tape against a transducer head comprising a spring member, and a pressure pad carried by said spring member, a dense non-woven fibrous tape engaging surface on said pad defined by substantially parallel, individual synthetic fibers of rayon of about 5½ denier, the outer free ends of said fibers engaging the tape at a multiplicity of yielding individual contact points, said fibers being substantially perpendicular to the plane of said tape, a compressible substrate secured to said spring member, inner ends of said fibers individually bonded to said substrate and projecting normal thereto and being flexible to bend in the direction of tape movement in either a forward or reverse direction movement of said tape, said compressible foam substrate being compressible to distribute forces from said spring member to said individual fibers, said fibers having a length in the range of about 1 to 3 millimeters and being individually flexible about their bonded inner ends to accommodate irregularities in the tape engaged thereby, said foam substrate having a substantially uniform cross-sectional thickness greater than three millimeters and having a flat surface to which are bonded said fibers.

2. A tape pressing means in which said foam substrate has a density of about 2 pounds per cubic foot and a pore size of about 80 to 90 PPI.

* * * * *